United States Patent
Sohn et al.

(10) Patent No.: US 7,764,269 B2
(45) Date of Patent: Jul. 27, 2010

(54) APPARATUS AND METHOD FOR CONTROLLING SPEED OF MOVING BETWEEN MENU LIST ITEMS

(75) Inventors: Jun-il Sohn, Yongin-si (KR); Dong-yoon Kim, Seoul (KR); Won-chul Bang, Seongnam-si (KR); Eun-seok Choi, Anyang-si (KR); Sung-jung Cho, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 838 days.

(21) Appl. No.: 11/598,698

(22) Filed: Nov. 14, 2006

(65) Prior Publication Data
US 2007/0180409 A1    Aug. 2, 2007

(30) Foreign Application Priority Data
Feb. 2, 2006    (KR) ............... 10-2006-0010071

(51) Int. Cl.
G09G 5/00    (2006.01)
(52) U.S. Cl. .................. 345/156; 345/169; 715/810
(58) Field of Classification Search ......... 345/156–178, 345/682, 684, 686, 687; 715/810–813, 829–832, 715/745, 789, 786, 785; 701/200–226
See application file for complete search history.

(56) References Cited

U.S. PATENT DOCUMENTS

| | | | | |
|---|---|---|---|---|
| 5,602,566 A | * | 2/1997 | Motosyuku et al. ......... | 345/684 |
| 6,157,381 A | * | 12/2000 | Bates et al. ................. | 715/786 |
| 6,433,793 B1 | * | 8/2002 | Ootsuka ..................... | 345/684 |
| 6,573,883 B1 | * | 6/2003 | Bartlett ...................... | 345/156 |
| 2003/0085870 A1 | * | 5/2003 | Hinckley ................... | 345/156 |
| 2004/0077381 A1 | * | 4/2004 | Engstrom .................. | 455/566 |
| 2005/0212751 A1 | | 9/2005 | Marvit et al. | |
| 2006/0195252 A1 | * | 8/2006 | Orr et al. ................... | 701/200 |
| 2006/0218506 A1 | * | 9/2006 | Srenger et al. ............. | 715/810 |

FOREIGN PATENT DOCUMENTS

| | | |
|---|---|---|
| EP | 1 696 301 A1 | 8/2006 |
| JP | 2001-136259 | 5/2001 |
| JP | 2002-268622 | 9/2002 |
| KR | 2004-26549 | 3/2004 |
| KR | 2004-106775 | 12/2004 |

* cited by examiner

*Primary Examiner*—Chanh Nguyen
*Assistant Examiner*—Adakou Foli
(74) *Attorney, Agent, or Firm*—Staas & Halsey LLP (57) ABSTRACT

The apparatus embodies a tilting interface controlling a signal using information regarding a tilt of a handheld device. The apparatus includes a tilt measurement module measuring the tilt of the handheld device; a history storage module storing, in order of time, a history of information regarding the measured tilt of the handheld device and a history of stop position information of the menu list items, the stop position information being created from the signal output according to the information regarding the measured tilt of the handheld device; and a moving speed control module controlling the speed of moving between the menu list items by setting a candidate range, to which a target item desired by a user belongs, using the histories.

21 Claims, 5 Drawing Sheets

SIDE VIEW OF HANDHELD DEVICE WHEN
TILTED FORWARD

TOTAL NUMBER OF MENU LIST ITEMS = 100 ITEMS

TARGET ITEM = 64$^{TH}$ ITEM

FIG. 5

APPARATUS AND METHOD FOR CONTROLLING SPEED OF MOVING BETWEEN MENU LIST ITEMS

CROSS-REFERENCE TO RELATED APPLICATIONS

This application claims priority from Korean Patent Application No. 10-2006-0010071 filed on Feb. 2, 2006 in the Korean Intellectual Property Office, the disclosure of which is incorporated herein by reference in its entirety.

BACKGROUND OF THE INVENTION

1. Field of the Invention

The present invention relates to an apparatus and method for controlling the speed of moving between menu list items and, more particularly, to an apparatus and method for controlling the speed of moving between menu list items by setting a candidate range, to which a target item desired by a user belongs, when navigating or searching the menu list items by tilting a handheld device.

2. Description of the Related Art

Recently, hand-held devices such as personal digital assistants (PDAs) and MP3 players have come into wide use, and key buttons have been used as major input units for these handheld devices. However, a user has to repeatedly press key buttons to input signals when navigating or searching a lot of menu list items to select a desired function. To reduce such inconvenience, research is being conducted on an interface having a tilting function which enables a user to perform an operation by shaking or tilting a handheld device such as a mobile phone, a PDA or a MP3 player.

Figure 1:
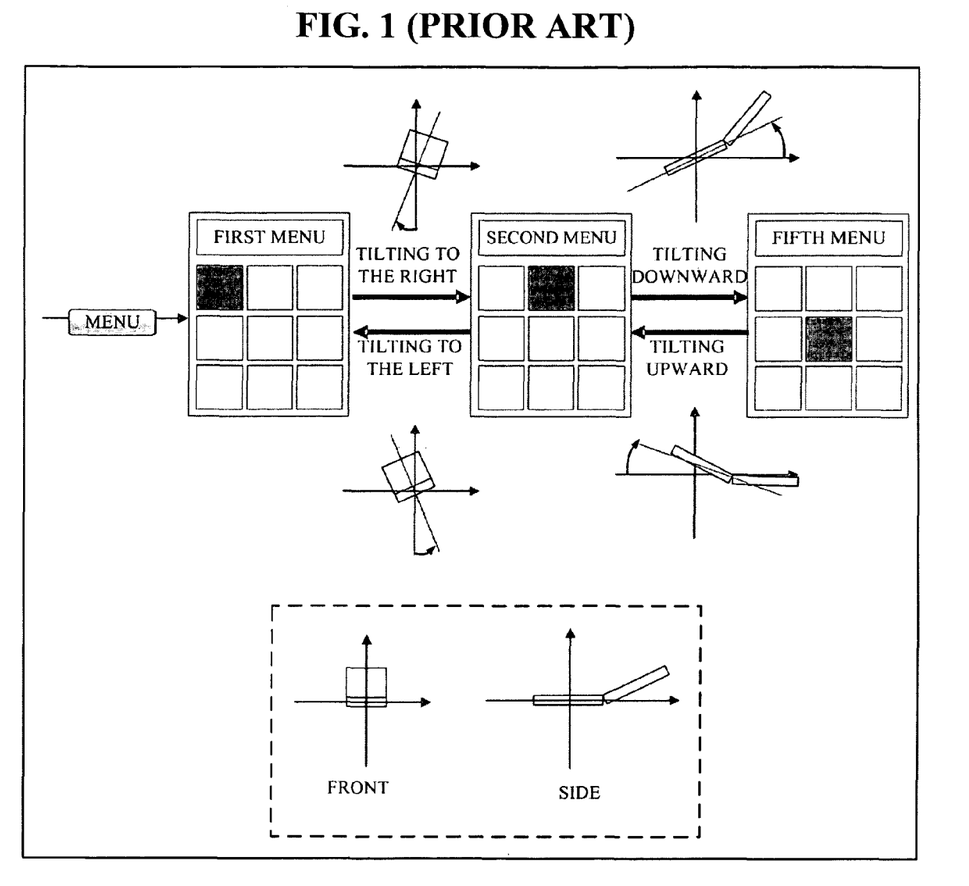
FIG. 1 is a diagram for explaining menu navigation using a conventional tilting interface.

FIG. 1 is a diagram for explaining menu navigation using a conventional tilting interface.

As illustrated in FIG. 1, three axes including one overlapping axis are required to measure frontal and lateral tilts of a handheld device. A user can move between different menu items, each in the form of 3×3 blocks, by tilting the handheld device upward/downward or to the left/right. Examples of this tilting interface function can be easily found in games or menu navigation using a tilt of a user's wrist sensed by a tilt sensor.

When tilting is implemented in an interface, the speed of moving between menus when a handheld device is tilted must be high in order to increase the convenience of the interface. However, when the speed of moving between menus is high, there may be some errors caused by a user tilting the handheld device. For example, while moving between menu items by tilting a handheld device, when a user reaches a desired menu item, the user has to return the handheld device to its original horizontal state (or a predetermined angle of tilt). However, when the tilting sensitivity of the handheld device or the speed of moving between menu items is high, the user may move to an undesired menu item in the process of returning the handheld device to its original horizontal state. Therefore, the user fails to stop precisely at the position of the desired menu item due to a time difference between visually perceiving a movement between the menu items and manipulating the handheld device by hand to stop the movement and errors made by the user while manipulating the handheld device by hand. For these reasons, the user cannot make inputs as intended.

In this regard, a technology for controlling the speed of moving between different menu list items is required.

SUMMARY OF THE INVENTION

The present invention provides an apparatus and method for controlling the speed of moving between menu list items by setting a candidate range, to which a target item desired by a user belongs, in order to reduce the frequency with which the user fails to stop at the target item.

However, the objectives of the present invention are not restricted to the one set forth herein. The above and other objectives of the present invention will become more apparent to one of daily skill in the art to which the present invention pertains by referencing a detailed description of the present invention given below.

According to an aspect of the present invention, there is provided an apparatus for controlling a speed of moving between menu list items, which embodies a tilting interface controlling a signal using information regarding a tilt of a handheld device. The apparatus includes a tilt measurement module measuring the tilt of the handheld device; a history storage module storing, in order of time, a history of information regarding the measured tilt of the handheld device and a history of stop position information of the menu list items, the stop position information being created from the signal output according to the information regarding the measured tilt of the handheld device; and a moving speed control module controlling the speed of moving between the menu list items by setting a candidate range, to which a target item desired by a user belongs, using the histories.

According to another aspect of the present invention, there is provided a method of controlling a speed of moving between menu list items, which embodies a tilting interface controlling a signal using information regarding a tilt of a handheld device. The method includes measuring the tilt of the handheld device; storing, in order of time, a history of information regarding the measured tilt of the handheld device and a history of stop position information of the menu list items, the stop position information being created from the signal output according to the information regarding the measured tilt of the handheld device; and controlling the speed of moving between the menu list items by setting a candidate range, to which a target item desired by a user belongs, using the histories.

BRIEF DESCRIPTION OF THE DRAWINGS

The above and other features and advantages of the present invention will become more apparent by describing in detail preferred embodiments thereof with reference to the attached drawings in which.

DETAILED DESCRIPTION OF THE PREFERRED EMBODIMENTS

The present invention will now be described more fully with reference to the accompanying drawings, in which exemplary embodiments of the invention are shown. The invention may, however, be embodied in many different forms and should not be construed as being limited to the embodiments set forth herein; rather, these embodiments are provided so that this disclosure will be thorough and complete, and will fully convey the concept of the invention to those skilled in the art. Like reference numerals in the drawings denote like elements, and thus their description will be omitted.

Embodiments of the present invention will hereinafter be described in detail with reference to the accompanying block diagrams or flowcharts. To explain a tilting interface which can reduce a time difference and errors made by a user while manipulating a handheld device by hand, the description of the embodiments of the present invention will be focused on menu item navigation. However, the present invention is not restricted to the menu item navigation. The present invention may also be applied to convert a direction of a tilt of a handheld device into a predetermined input signal. In an embodiment of the present invention, an input signal may be generated by tilting a handheld device to the left or right to control a movement to the left or right in a game running on the handheld device. The tilting interface is used to select a menu list item.

Figure 2:
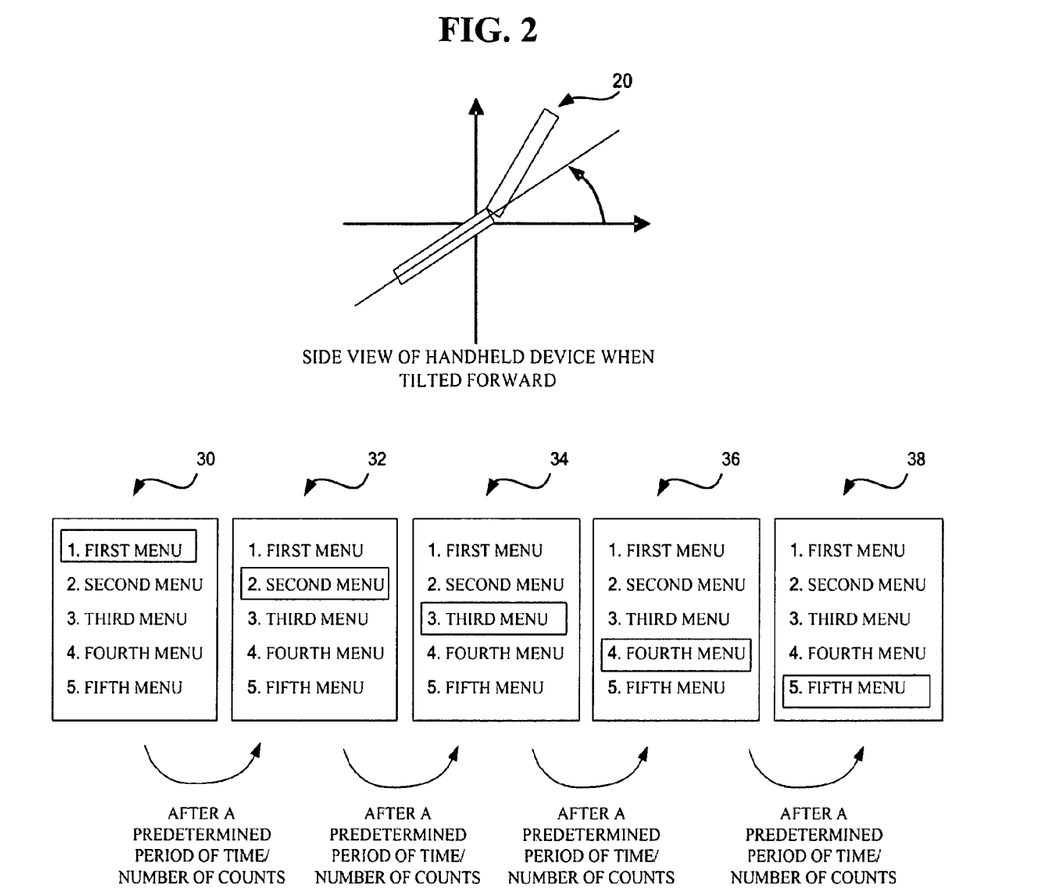
FIG. 2 is a diagram for explaining a method of moving between menu items by tilting a handheld device according to an embodiment of the present invention.

FIG. 2 is a diagram for explaining a method of moving between menu items by tilting a handheld device according to an embodiment of the present invention. Referring to FIG. 2, when a user tilts the handheld device forward while holding the handheld device, a side view of the tilted handheld device is as indicated by reference numeral 20. When the user tilts the handheld device forward, menu items of the handheld device are navigated through states 30, 32, 34, 36 and 38, sequentially. While in the state 30, if the user tilts the handheld device forward, the handheld device is put in the state 32, in which a second menu item is selected, after a predetermined period of time or a predetermined number of counts. When the user maintains the current state or further tilts the handheld device forward, the menu items are navigated through the fifth states 34, 36 and 38.

Figure 3:
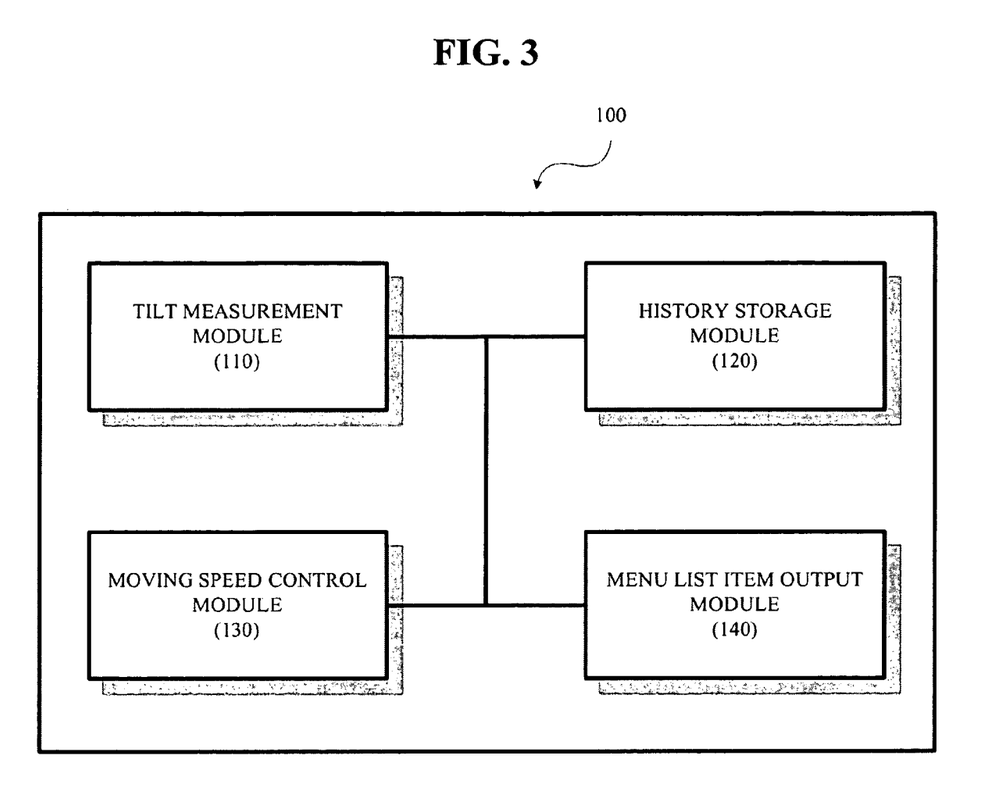
FIG. 3 is a block diagram illustrating the entire configuration of an apparatus for controlling the speed of moving between menu list items according to an embodiment of the present invention.

FIG. 3 is a block diagram illustrating the entire configuration of an apparatus 100 for controlling the speed of moving between menu list items according to an embodiment of the present invention. Referring to FIG. 3, the apparatus 100 embodies a tilting interface which controls a signal based on information regarding a tilt of a handheld device. The apparatus 100 includes a tilt measurement module 110, a history storage module 120, a moving speed control module 130, and a menu list item output module 140.

The tilt measurement module 110 measures the tilt of the handheld device and thus obtains information regarding the tilt of the handheld device. More specifically, the tilt measurement module 110 includes a sensor (not shown) outputting an electrical signal according to a degree of tilt of the handheld device using a tilt sensor embedded in the handheld device and a converter (not shown) converting the output electrical signal into information regarding the tilt of the handheld device.

The tilt sensor may include at least one of a 3-axis acceleration sensor, a gyro sensor, a terrestrial magnetism sensor, and an altimeter sensor. The 3-axis acceleration sensor measures acceleration in x-, y-, z-axis directions. The gyro sensor detects the angular speed of the handheld device when rotating about an axis. The terrestrial magnetism sensor detects information regarding a direction in which the handheld device faces. The altimeter sensor detects information regarding the altitude of the handheld device. Of these sensors, the 3-axis acceleration sensor may be mainly used.

The information regarding the tilt of the handheld device includes information regarding a direction of tilt of the handheld device and information regarding an angle of tilt, which indicates a degree of tilt, of the handheld device.

The history storage module 120 stores a history of information regarding the measured tilt of the handheld device and a history of stop position information of menu list items, the stop position information being created from the signal output according to the information regarding the measured tilt of the handheld device. In other words, whenever the handheld device tilted to move between menu items is returned to its original horizontal state or whenever the direction of tilt of the handheld device is changed, the history storage module 120 stores information regarding the direction and angle of tilt of the handheld device. In addition, the history storage module 120 continuously stores position information of a menu list item selected at the direction and angle of tilt of the handheld device in order of time. Meanwhile, the signal is output to move in a predetermined direction to a menu list item or stop at a menu list item.

The moving speed control module 130 sets a candidate range, to which a target item desired by the user belongs, using the histories. By setting the candidate range, the speed of moving between the menu list items displayed on the handheld device can be controlled.

There may be a variety of methods of setting the candidate range. However, in the present embodiment, when a position at which the tilting of the handheld device for searching for a target item is stopped is not the position of the target item and thus the search for the target item is resumed, the candidate range is set as follows. A range extending from a menu list item selected at the position where the tilting of the handheld device was stopped to the limit of the menu list items, which are within a previous candidate range set before the search for the target item is resumed and which exist in a direction in which the search for the target item is resumed, is set as the candidate range. In other words, the moving speed control module 130 sets the candidate range, within which the target item searched for by the user is expected to exist, based on the history of information regarding the tilt of the handheld device and the history of stop position information of the menu list items, the stop position information being created according to the information regarding the tilt of the handheld device.

When the user initially starts to tilt the handheld device to search for the target item, the number of candidate items within the candidate range is set equal to the total number of menu list items. When the user stops at an undesired menu item while continuously tilting the handheld device to search for the target item, the user resumes the research for the target item by tilting the handheld device again. In this case, the entire menu list items may be divided into two ranges extending in opposite directions from the stop position. Which range the target item belongs to can be predicted in advance according to a direction in which the user intends to resume the research. Here, the number of candidate items within the candidate range is reduced.

If the user fails again to stop at the target item after resuming the research, the user has to resume the search again. Considering the stop position and the search direction, the candidate range within which the target item desired by the user is expected to exist is further reduced. Accordingly, the number of candidate items within the candidate range is further reduced.

When the user continuously inputs a signal to deviate from the candidate range set by the user, that is, when the user continues to tilt the handheld device although no new movement can be made between the menu items since the entire candidate range is searched, the candidate range can be expanded back to the previous candidate range.

After the candidate range is set, the speed of moving between the menu list items displayed on the handheld device must be controlled. The moving speed control module 130 may calculate the speed of moving between the menu list items to be proportional to the number of menu list items within the candidate range. In other words, the speed of moving between the menu list items is controlled using information regarding the set candidate range. Therefore, as the candidate range becomes wider, the speed of moving between the menu items is controlled to become higher. Conversely, as the candidate range becomes narrower, the speed of moving between the menu items is controlled to become slower. This relationship may be defined by "moving speed=k*(the number of menu list items within a candidate range)," where k indicates a predetermined gain. Such a method of controlling the moving speed will be described in more detail with reference to FIG. 4.

Figure 4:
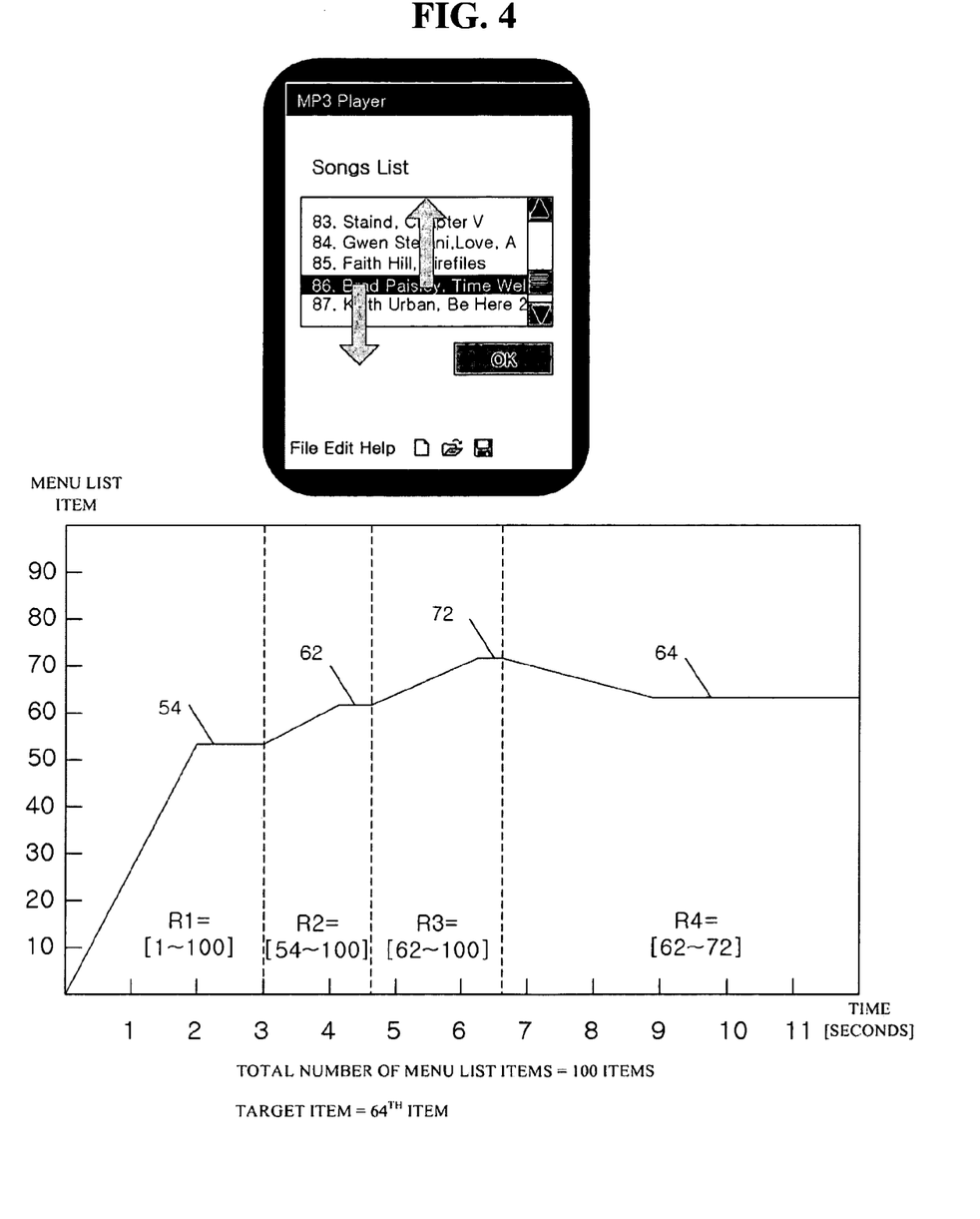
FIG. 4 is a graph for explaining a method of controlling the speed of moving between menu list items according to an embodiment of the present invention.

FIG. 4 is a graph for explaining a method of controlling the speed of moving between menu list items according to an embodiment of the present invention.

Specifically, a screen of an MP3 player for explaining a process of moving between a list of song titles displayed thereon is shown in the upper part of FIG. 4. Referring to the upper part of FIG. 4, an item above or below item number 86 may be selected according to a direction of tilt of the MP3 player.

The lower part of FIG. 4 illustrates a graph for explaining a method of setting a candidate range to which a target item desired by a user belongs and a method of controlling the speed of moving between menu list items by setting the candidate range. In the lower part of FIG. 4, R1, R2, R3 and R4 indicate candidate ranges in respective sections.

As described above, when the user starts to tilt a handheld device to search for the target item, the user sets the number of candidate items in the candidate range to 100, which is equal to the total number of menu list items. Assuming that the target item is a $64^{th}$ item out of the 100 items, the user tilts the handheld device to move toward the $64^{th}$ item. If the user stops at, e.g., a $54^{th}$ item, the menu items are divided into a range of $0^{th}$ to $54^{th}$ items and another range of $54^{th}$ to $100^{th}$ items. Hence, the user resumes to search for the target item from the $54^{th}$ item to the $100^{th}$ item. It can be understood from the direction of this search that the $64^{th}$ item, which is the target item desired by the user, is expected to exist between the $54^{th}$ item and the $100^{th}$ item. Therefore, the candidate range in this case extends from the $54^{th}$ item to the $100^{th}$ item.

When the user stops at, e.g., the $62^{nd}$ item while searching for the target item in the range of the $54^{th}$ to $100^{th}$ items, the menu items are divided again into a range of the $54^{th}$ to $61^{st}$ items and another range of the $62^{nd}$ to $100^{th}$ items. Then, the user resumes to search for the target item from the $62^{nd}$ item to the $100^{th}$ item. Therefore, the candidate range in this case extends from the $62^{nd}$ item to the $100^{th}$ item, and the speed of moving between the menu list items may become a little slower than before.

Next, when the user stops at, e.g., the $72^{nd}$ item while searching for the target item again in the range of the $62^{nd}$ to $100^{th}$ items, the menu items are divided again into a range of the $62^{nd}$ to $72^{nd}$ items and another range of the $73^{rd}$ to $100^{th}$ items. Then, the user resumes to search for the target item down from the $72^{nd}$ item. Therefore, the candidate range in this case extends from the $62^{nd}$ item to the $72^{nd}$ item, and the speed of moving between the menu list items become far slower than before.

If the search for the target item is repeated in the this way, the speed of moving between the menu list items becomes slower in proportion to the number of candidate items within the candidate range. Accordingly, the user can easily find the desired target item.

The menu list item output module 140 outputs a value corresponding to a change of movement, that is, either a movement between menu list items or the stoppage of the movement at a menu list item in response to the output signal according to the information regarding the measured tilt of the handheld device.

The term 'module', as used herein, means, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. In addition, the components and modules may be implemented to execute one or more central processing units (CPUs) in a device.

Figure 5:
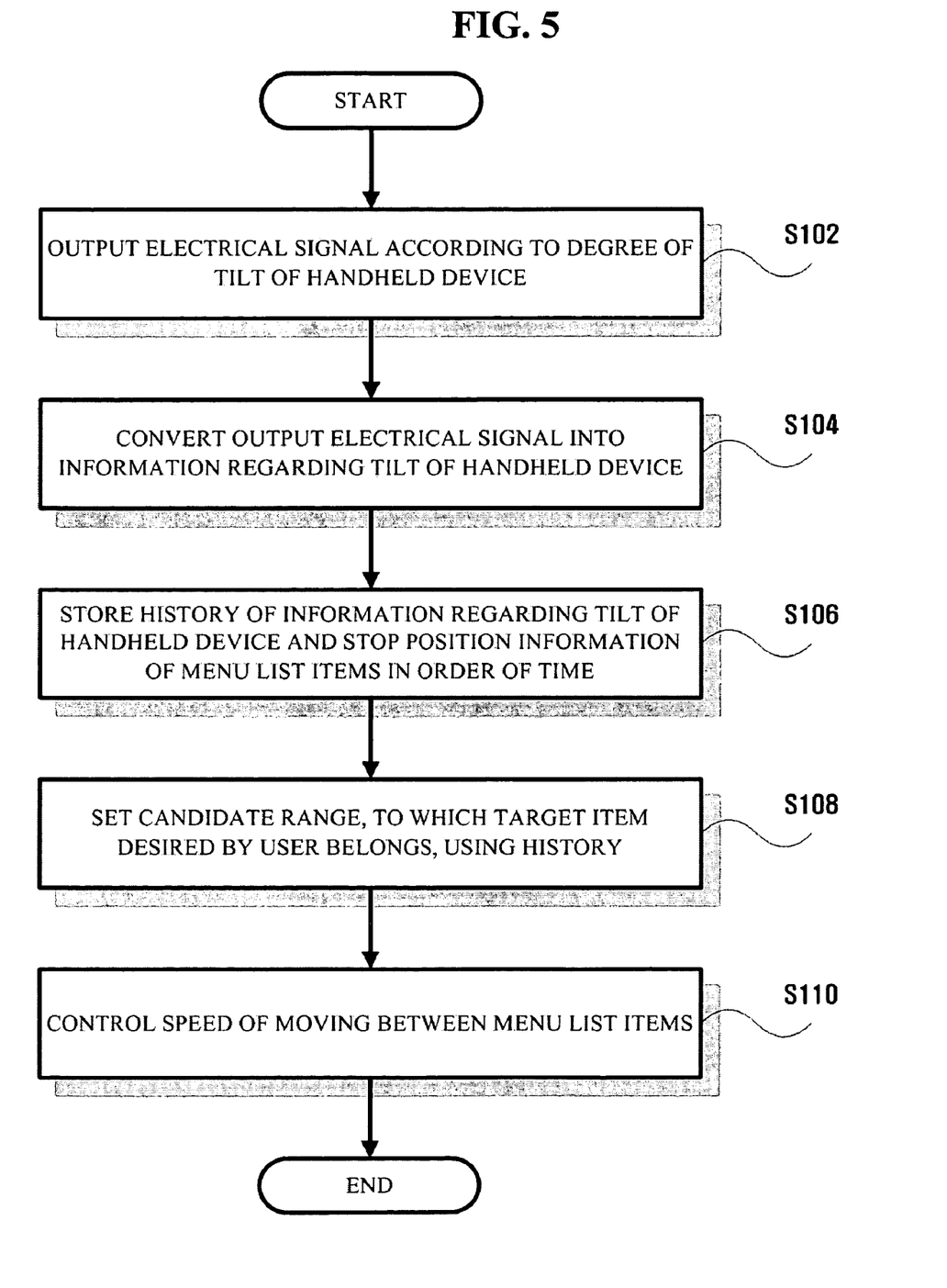
FIG. 5 is a flowchart illustrating a method of controlling the speed of moving between menu list items according to an embodiment of the present invention.

A method of controlling the speed of moving between menu list items according to an embodiment of the present invention will hereinafter be described in detail with reference to FIG. 5.

In this method, which embodies a tilting interface controlling a signal using information regarding a tilt of the handheld device, the tilt measurement module 110 measures the tilt of the handheld device, which will now be described in more detail.

In other words, the sensor (not shown) outputs an electrical signal according to a degree of tilt of the handheld device using the tilt sensor embedded in the handheld device (operation S102). Then, the converter (not shown) converts the output electrical signal into information regarding the tilt of the handheld device (operation S104). The tilt sensor may include at least one of a 3-axis acceleration sensor, a gyro sensor, a terrestrial magnetism sensor, and an altimeter sensor.

The information regarding the tilt of the handheld device may include information regarding the direction and angle of tilt of the handheld device.

The history storage module 120 stores, in order of time, a history of information regarding the measured tilt of the handheld device and a history of stop position information of menu list items, the stop position information being created from the signal output according to the information regarding the measured tilt of the handheld device (operation S106).

Then, the moving speed control module 130 sets a candidate range, to which a target item desired by the user belongs, using the histories (operation S108). The candidate range is between the limit of the menu list items reached when the handheld device is tilted in a positive direction and the limit of the menu list items reached when the handheld device is tilted in a negative direction. When a position at which the tilting of the handheld device for searching for the target item is stopped is not the position of the target item and thus the search for the target item is resumed, the candidate range is set to be a range extending from a menu list item selected at the position where the tilting of the handheld device was stopped to the limit of the menu list items, which are within a previous candidate range set before the search for the target item is resumed and which exist in a direction in which the search for the target item is resumed. As described above, the candidate range set when the user initially starts to tilt the handheld device to search for the target item covers the entire menu list items.

After the candidate range is set, the moving speed control module 130 controls the speed of moving between the menu list items displayed on the handheld device (operation S110). The speed of moving between the menu list items is proportional to the number of menu list items within the candidate range. Since this relationship has been described above, a detailed description thereof will be omitted here.

The apparatus and method for controlling the speed of moving between menu list items can be applied to various handheld devices. For example, in the case of a handheld device running a game, up, down, left, and right signals generated by tilting the handheld device can be used to control the game. Examples of the handheld devices to which the apparatus and method can be applied include mobile phones, PDAs, portable game players, game controllers, MP3 players, and personal multimedia players (PMPs).

According to an embodiment of the present invention, the speed of moving between menu list items can be controlled by setting a candidate range to which a target item desired by a user belongs.

In addition, the frequency with which the user moves to an undesired menu item while navigating menu items by tilting a handheld device can be reduced, thereby enhancing the usability of a tilting interface.

The above and other effects of the present invention will become more apparent to one of daily skill in the art to which the present invention pertains by referencing the following claims.

It is obvious to those of ordinary skill in the art that the present invention can also be implemented as computer-readable code on a computer-readable recording medium.

While the present invention has been particularly shown and described with reference to exemplary embodiments thereof, it will be understood by those of ordinary skill in the art that various changes in form and details may be made therein without departing from the spirit and scope of the present invention as defined by the appended claims. The embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. An apparatus for controlling a speed of moving between menu list items, which embodies a tilting interface controlling a signal using information regarding a tilt of a handheld device, the apparatus comprising:
    a tilt measurement module measuring the tilt of the handheld device;
    a history storage module storing both a history of information regarding the measured tilt of the handheld device and a history of stop position information of the menu list items, in order of time, the stop position information being created from a signal output according to the information regarding the measured tilt of the handheld device; and
    a moving speed control module controlling the speed of moving between the menu list items by setting a candidate range, to which a target item desired by a user belongs, using the histories.

2. The apparatus of claim 1, wherein the tilt measurement module comprises:
    a sensor outputting an electrical signal according to a degree of tilt of the handheld device using a tilt sensor embedded in the handheld device; and
    a converter converting the output electrical signal into the information regarding the tilt of the handheld device.

3. The apparatus of claim 2, wherein the tilt sensor comprises at least one of a 3-axis acceleration sensor, a gyro sensor, a terrestrial magnetism sensor, and an altimeter sensor.

4. The apparatus of claim 2, wherein the information regarding the tilt of the handheld device comprises information regarding a direction and an angle of tilt of the handheld device.

5. The apparatus of claim 1, further comprising a menu list item output module outputting a value corresponding to a change of movement,
    wherein
        the change of movement comprises a movement between the menu list items or a stoppage of the movement at a menu list item according to the signal,
        the tilting interface is used to select a menu list item, and
        the signal is used to move in a predetermined direction to a menu list item or stop at a menu list item.

6. The apparatus of claim 1, wherein the moving speed control module calculates the speed of moving between the menu list items to be proportional to the number of menu list items within the candidate range.

7. The apparatus of claim 6, wherein the candidate range is between a limit of the menu list items reached when the handheld device is tilted in a positive direction and a limit of the menu list items reached when the handheld device is tilted in a negative direction, and, when a position at which tilting of the handheld device for searching for the target item is stopped is not the position of the target item and thus the search for the target item is resumed, the candidate range is set to be a range extending from a menu list item selected at the position where the tilting of the handheld device was stopped to the limit of the menu list items, which are within a previous candidate range set before the search for the target item is resumed.

8. The apparatus of claim 7, wherein the candidate range set when the user initially starts to tilt the handheld device in order to search for the target item covers the entire menu list items.

9. The apparatus of claim 1, wherein at an initial time when the user initially starts to tilt the handheld device to search for the target item, the number of candidate items within the candidate range is set to the total number of the menu list items, and
    as the user searches for the target item after the initial time, the candidate range is reduced based on the history of stop position information and a direction the user searches for the target item.

10. The apparatus of claim 1, wherein at an initial time when the user initially starts to tilt the handheld device to search for the target item, the number of candidate items within the candidate range is set to the total number of the menu list items, and as the user searches for the target item after the initial time, if the user stops at an undesired menu item and then begins searching for the target item again, the candidate range is reduced based on the history of the stop position information and a direction the user begins searching again for the target item.

11. A method of controlling a speed of moving between menu list items using information regarding a tilt of a handheld device, the method comprising:

measuring the tilt of the handheld device;

storing both a history of information regarding the measured tilt of the handheld device and a history of stop position information of the menu list items, in order of time, the stop position information being created from a signal output according to the information regarding the measured tilt of the handheld device; and controlling the speed of moving between the menu list items by setting a candidate range, to which a target item desired by a user belongs, using the histories.

12. The method of claim 11, wherein the measuring of the tilt of the handheld device comprises:

outputting an electrical signal according to a degree of tilt of the handheld device using a tilt sensor embedded in the handheld device; and converting the output electrical signal into the information regarding the tilt of the handheld device.

13. The method of claim 12, wherein the tilt sensor comprises at least one of a 3-axis acceleration sensor, a gyro sensor, a terrestrial magnetism sensor, and an altimeter sensor.

14. The method of claim 12, wherein the information regarding the tilt of the handheld device comprises information regarding a direction and an angle of tilt of the handheld device.

15. The method of claim 11, further comprising outputting a value corresponding to a change of movement, wherein the change of movement comprises a movement between the menu list items or a stoppage of the movement at a menu list item according to the signal, the tilting interface is used to select the menu list items, and the signal is used to move in a predetermined direction to a menu list item or stop at a menu list item.

16. The method of claim 11, wherein the controlling of the speed of moving between the menu list items comprises calculating the speed of moving between the menu list items to be proportional to the number of menu list items within the candidate range.

17. The method of claim 16, wherein the candidate range is between a limit of the menu list items reached when the handheld device is tilted in a positive direction and a limit of the menu list items reached when the handheld device is tilted in a negative direction, and, when a position at which tilting of the handheld device for searching for the target item is stopped is not the position of the target item and thus the search for the target item is resumed, the candidate range is set to be a range extending from a menu list item selected at the position where the tilting of the handheld device was stopped to the limit of the menu list items, which are within a previous candidate range set before the search for the target item is resumed.

18. The method of claim 17, wherein the candidate range set when the user initially starts to tilt the handheld device in order to search for the target item covers the entire menu list items.

19. A non-transitory computer-readable recording medium encoded with a computer program for executing the method of claim 11.

20. The method of claim 11, wherein the at an initial time when the user initially starts to tilt the handheld device to search for the target item, the number of candidate items within the candidate range is set to the total number of the menu list items, and wherein as the user searches for the target item after the initial time, the candidate range is reduced based on the history of stop position information and a direction the user searches for the target item.

21. The method of claim 11, wherein at an initial time when the user initially starts to tilt the handheld device to search for the target item, the number of candidate items within the candidate range is set to the total number of the menu list items, and as the user searches for the target item after the initial time, if the user stops at an undesired menu item and then begins searching for the target item again, the candidate range is reduced based on the history of the stop position information and a direction the user begins searching again for the target item.

* * * * *